United States Patent
Yukawa et al.

(10) Patent No.: US 7,717,146 B2
(45) Date of Patent: May 18, 2010

(54) PNEUMATIC TIRE AND NOISE DAMPER ASSEMBLY

(75) Inventors: Naoki Yukawa, Kobe (JP); Hiroshi Hamada, Tokyo-to (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 749 days.

(21) Appl. No.: 11/607,876

(22) Filed: Dec. 4, 2006

(65) Prior Publication Data

US 2007/0131327 A1    Jun. 14, 2007

(30) Foreign Application Priority Data

Dec. 12, 2005    (JP)    ............................. 2005-357999

(51) Int. Cl.
*B60C 5/00*    (2006.01)
*B60C 19/00*    (2006.01)
(52) U.S. Cl. ...................................... 152/450; 152/151
(58) Field of Classification Search .................. 152/450
See application file for complete search history.

(56) References Cited

U.S. PATENT DOCUMENTS

| 6,755,483 | B2 | 6/2004 | Yukawa et al. |
| 2005/0098251 | A1 | 5/2005 | Yukawa |
| 2005/0155686 | A1* | 7/2005 | Yukawa et al. .............. 152/450 |
| 2005/0205183 | A1 | 9/2005 | Yukawa |
| 2007/0119533 | A1 | 5/2007 | Yukawa |
| 2007/0199636 | A1 | 8/2007 | Tanno |

FOREIGN PATENT DOCUMENTS

| EP | 1 577 123 A1 | 9/2005 |
| EP | 1 741 570 A1 | 1/2007 |
| JP | 2006-298299 A | 11/2006 |
| WO | WO-2005/100051 A1 | 10/2005 |

* cited by examiner

*Primary Examiner*—Adrienne C Johnstone
(74) *Attorney, Agent, or Firm*—Birch Stewart Kolasch & Birch, LLP

(57) ABSTRACT

A pneumatic tire and noise damper assembly comprises a pneumatic tire, a noise damper being attached to an inner surface of the tire and extending in the circumferential direction of the tire, and a protective cover being detachably attached to the tire and protecting the noise damper from ultraviolet rays and water.

5 Claims, 9 Drawing Sheets

(Unit : mm)

(Unit : mm)

PNEUMATIC TIRE AND NOISE DAMPER ASSEMBLY

BACKGROUND OF THE INVENTION

1. Field of the Invention

The present invention relates to a pneumatic tire and noise damper assembly which comprises a pneumatic tire and a noise damper being attached to the tire, more particularly to the assembly which can prevent deterioration of the noise damper caused by ultraviolet rays and water.

2. Background Art

In recent years, in order to reduce a road noise, a pneumatic tire and noise damper assembly is proposed. The assembly comprises a pneumatic tire and a noise damper made of spongy material and being attached to the inner surface of the tire.

The tire and noise damper assembly is mounted on a rim and is used for a vehicle. Before being mounted on the rim, the assembly may be kept in storage vertically or horizontally. Especially when the assembly is kept in outside storage, rain water (moisture) stays in the tire cavity surrounded by the inner surface, and the water is infiltrated into a noise damper in some cases. This increases the weight of the assembly, and a weight unbalance is caused and the noise damper is contaminated. If the noise damper is exposed to ultraviolet rays for a long term, the noise damper is prone to be deteriorated. To protect the noise damper from water and ultraviolet rays, it seems to be effective to accommodate the assembly in a bag or a box and keep the same in storage. However, this method makes it difficult to roll and move the assembly (tire), and its handling becomes inconvenient.

SUMMARY OF THE INVENTION

The present invention has been accomplished in view of the above circumstances. It is a main object of the invention to provide a pneumatic tire and noise damper assembly capable of effectively preventing the noise damper from being deteriorated while the assembly is kept in storage on the basis of an idea that a protective x for protecting at least a portion of a noise damper from water and ultraviolet rays is detachably attached to a tire.

According to the present invention, a pneumatic tire and noise damper assembly comprises a pneumatic tire, a noise damper being attached to an inner surface of the tire and extending in the circumferential direction of the tire, and a protective cover being detachably attached to the tire and protecting the noise damper from ultraviolet rays and water.

DESCRIPTION OF THE PREFERRED EMBODIMENTS

Figure 1:
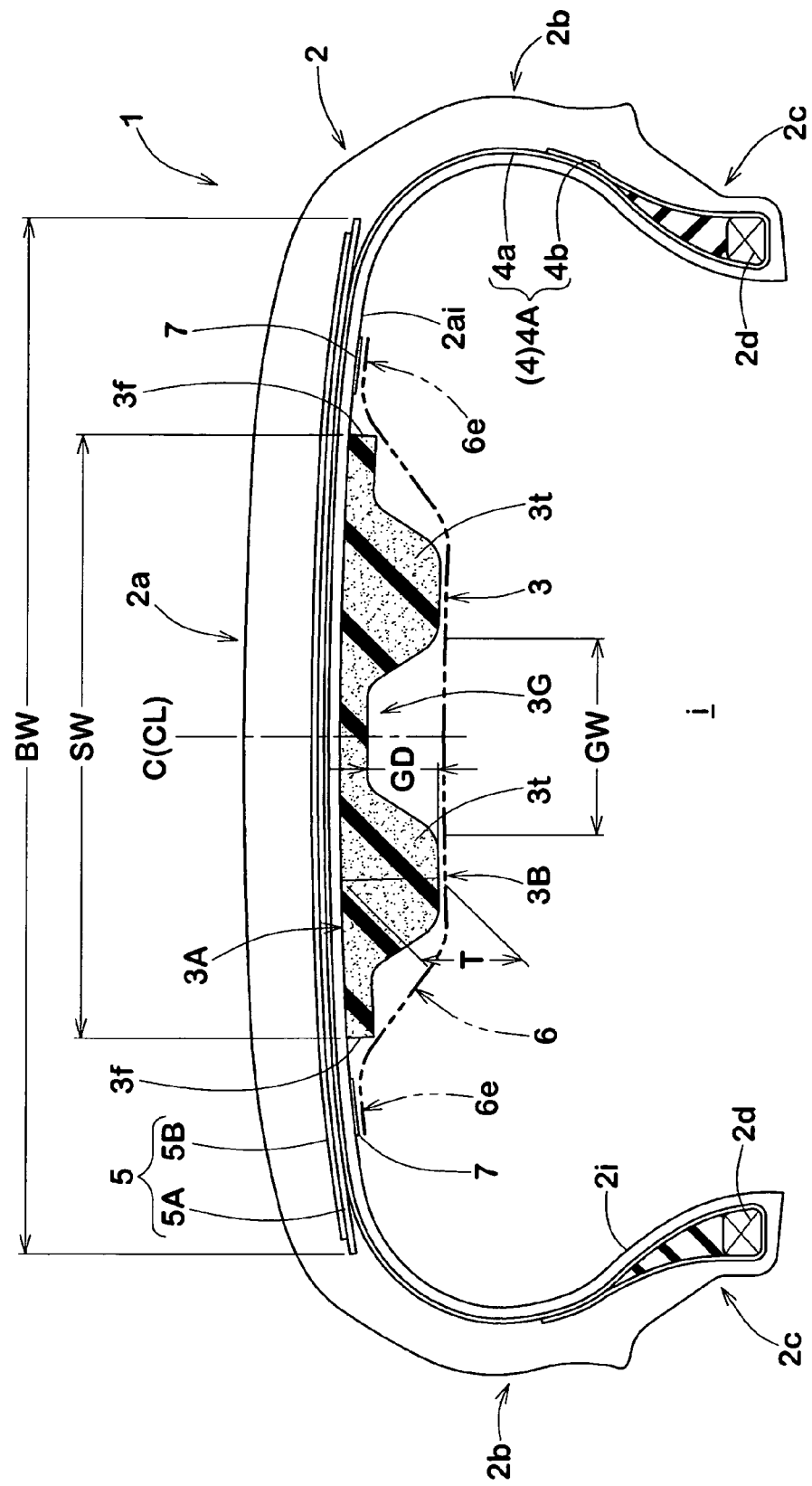
FIG. 1 is a cross sectional view showing an embodiment of a pneumatic tire and noise damper assembly of the present invention.

Embodiments of the present invention will now be described in detail in conjunction with the accompanying drawings.

In the drawings, a pneumatic tire and noise damper assembly 1 according to the present invention comprises a pneumatic tire 2 with a toroidal body and a noise damper 3 being attached to the inner surface 2i of the tire 2.

The pneumatic tire 2 comprises a tread portion 2a, a pair of bead portions 2c each with a bead core 2d therein, and a pair of sidewall portions 2b extending between the tread portion 2a and the bead portion 2c. In this embodiment, the tire 2 is showed as a tubeless tire for passenger car with the inner surface 2i made of a gas-impermeable rubber.

The pneumatic tire 2 further comprises a carcass 4 and a belt 5 disposed radially outside the carcass 4 in the tread portion 2a.

The carcass 4 comprises at least one carcass ply 4A of organic fiber cords which comprises a main body 4a extending between the bead cores 2d, 2d, and a pair of turnup portions each turned up around the bead core 2d from the axially inside to the outside of the tire.

In this embodiment, the belt 5 comprises two cross belt plies 5A and 5B of parallel cords laid at an angle of from 10 to 30 degrees with respect to the tire equator C. For the belt cords, steel cords, and high modulus organic fiber cords such as aramid, rayon and like can be used.

Here, the internal structure of the tire 2 may be suitably changed based on the category of the tire.

The noise damper 3 is made of spongy material and extends in the circumferential direction of the tire. Here, the spongy material means not only a foamed elastomer or plastic of an open-cell or closed-cell type but also shaped intertangled fiber such as synthetic fiber, plant fiber and animal fiber. In this embodiment, open-cell type poly-urethane foam is used.

Since the spongy material mention above has high vibration isolation ability and sound absorption ability, it can efficiently absorb vibrational energy in the cavity i of the tire 2. As a result, the resonance of the cavity i of the tire 2 is suppressed, and road noise becomes smaller. Further, since the spongy material can easily be shrunk, bent and deformed, it does not hinder the steering stability of the tire 2. Further, since the spongy material has a small specific gravity as compared with a solid rubber, the porous material does not deteriorate the weight balance of the tire. AS for the specific gravity of the spongy material, it is preferably set in the range of from 0.014 to 0.052.

As to the spongy material, synthetic resin sponge such as ether-based polyurethane sponge, ester-based polyurethane sponge and polyethylene sponge, and rubber sponge such as chloroprene rubber sponge (CR sponge), ethylene propylene rubber sponge (EPDM sponge) and nitrile rubber sponge (NBR sponge) are preferably used. In view of sound-reduction performance, light-weighted performance, foaming adjustability, endurance and the like, urethane-based sponge and polyethylene-based sponge such as ether-based polyurethane sponge are especially preferable.

The air filled in the tire cavity i may include water (moisture) in many cases. Thus, ether polyurethane sponge which is strong for hydrolytic degradation is preferable as the spongy material. Also, in order to prevent absorbing of water, the spongy material is preferably provided with water repellency. It is further preferable that the spongy material has mildewproof. Further, in order to prevent toxic gas from being generated when the tire is incinerated, it is preferable that the spongy material does not contain halogen atom.

The volume of the noise damper 3 is preferably set in the range of from 0.4 to 20% of the volume of the cavity I of the tire 2. With this, it may be possible to reduce the road noise at least 2 dB. More preferably, the volume of the noise damper 3 is set in the range of not less than 1%, more preferably not less than 2%, still preferably not less than 4%, but not more than 10% of the volume of the tire cavity i.

In this specification, the expression "volume of the noise damper" means the apparent entire volume of the noise damper including inside bubbles. Further, the "volume of the tire cavity" V1 is defined under the standard condition by the following approximate equation:

$$V1 = A \times \{(Di-Dr)/2 + Dr\} \times \pi$$

where

"A" is the cross sectional area of the tire cavity i,

"Di" is the maximum outer diameter of the tire cavity i, and

"Dr" is the wheel rim diameter.

The above-mentioned standard condition is such that the tire 2 is mounted on a standard wheel rim and inflated to a standard pressure but loaded with no tire load.

The standard rim is the "standard rim" specified in JATMA, the "Measuring Rim" in ETRTO, the "Design Rim" in TRA or the like.

The standard pressure is the "maximum air pressure" in JATMA, the "Inflation Pressure" in ETRTO, the maximum pressure given in the "Tire Load Limits at various cold Inflation Pressures" table in T&RA of the like. In case of passenger car tires, however, 200 kPa is used as the standard pressure.

The noise damper 3 has a bottom surface 3A with a smooth surface fixed to the inner surface 2i of the tire 2 and upper surface 3B facing to the tire cavity i. With this, the noise damper 3 does not move freely when tire 2 is running.

Preferably, the noise damper 3 is fixed to a tread region 2ai of the inner surface 2i of the tire 2. Here, "tread region" 2ai is an inside region of the belt with a width equal to the width BW of the belt 5. A centrifugal force when the vehicle runs at high speed acts outward in the radial direction of the tire. Thus, the tire 2 and the noise damper 3 fixed to the tread region 2ai are strongly pushed against each other by the centrifugal force, thereby preventing the upper surface 3B from being peeled off. In this embodiment, the center of the width SW of the noise damper 3 is arranged onto the tire equator C.

The maximum thickness T of the noise damper 3 is not limited to, but is preferably not more than 40 mm, more preferably not more than 30 mm, further preferably not more than 25 mm. If the maximum thickness T of the damper 3 becomes too large, the damper 3 may be broken by contacting with a tire lever which may be used for mounting the tire on a wheel rim. On the other hand, if the maximum thickness T of the damper 3 becomes too small, the effect for absorbing the sound energy in the tire cavity tends to decrease. In this point of view, the maximum thickness T of the damper 3 is preferably not less than 10 mm, and more preferably not less than 15 mm.

In order to stabilize the position of the noise damper 3, the width SW of the noise damper 3 is preferably Larger than the maximum thickness T thereof. Especially, the width SW of the noise damper 3 is preferably not less than 20%, more preferably not less than 30%, further preferably not less than 40% of the width BW of the belt 5, but an upper limit thereof is preferably not more than 80%, more preferably not more than 70% of the width BW.

In this embodiment, the cross section shape of the noise damper 3 is substantially continued in the circumferential direction of the tire except for the circumferential edges thereof. The cross section shape of the noise damper 3 is not especially limited, but preferably rectangular shape, trapezoidal shape, triangular shape, nose shape, semi-circular shape and the like are suitable. The cross section shape of the noise damper 3 may be suitably designed based on productivity, durability, and the load noise reduction effect thereof.

The especially preferable cross section shape of the noise damper 3 is laterally symmetric with respect to a center line CL (the center line CL matches with the tire equator c in this embodiment) of the width SW, and the cross section includes (total two) projecting parts 3t projecting toward the tire cavity i and provided on both sides (one each) of the center line CL as shown in FIG. 1.

Further, the noise damper 3 is provided with one groove 3G extending in the circumferential direction of the tire on the side of the upper surface 3B and between the projecting parts 3t. With this, the upper surface 3B of the noise damper 3 is formed into an uneven surface so that a surface area of the noise damper 3 facing the tire cavity is increased. Accordingly, the noise damper 3 comes into contact with more air so that the cavity resonance energy is efficiently absorbed. Further, the increasing of the surface area of the noise damper improves the radiation performance of the noise damper 3, and it is possible to prevent the tire from being thermally destroyed.

To further improve the mention-above effect, it is preferable that the depth GD of the groove 3G is not less than 20% of the maximum thickness T of the noise damper 3, and more preferably not less than 30%, the upper limit is not more than 95%, more preferably not more than 90%, and more preferably not more than 80%. Further, the maximum width GW of the groove 3G is preferably not less than 15% of the width SW of the noise damper 3, more preferably not less than 25%, and the upper limit is not more than 70%, and more preferably not more than 45%.

Figure 2:
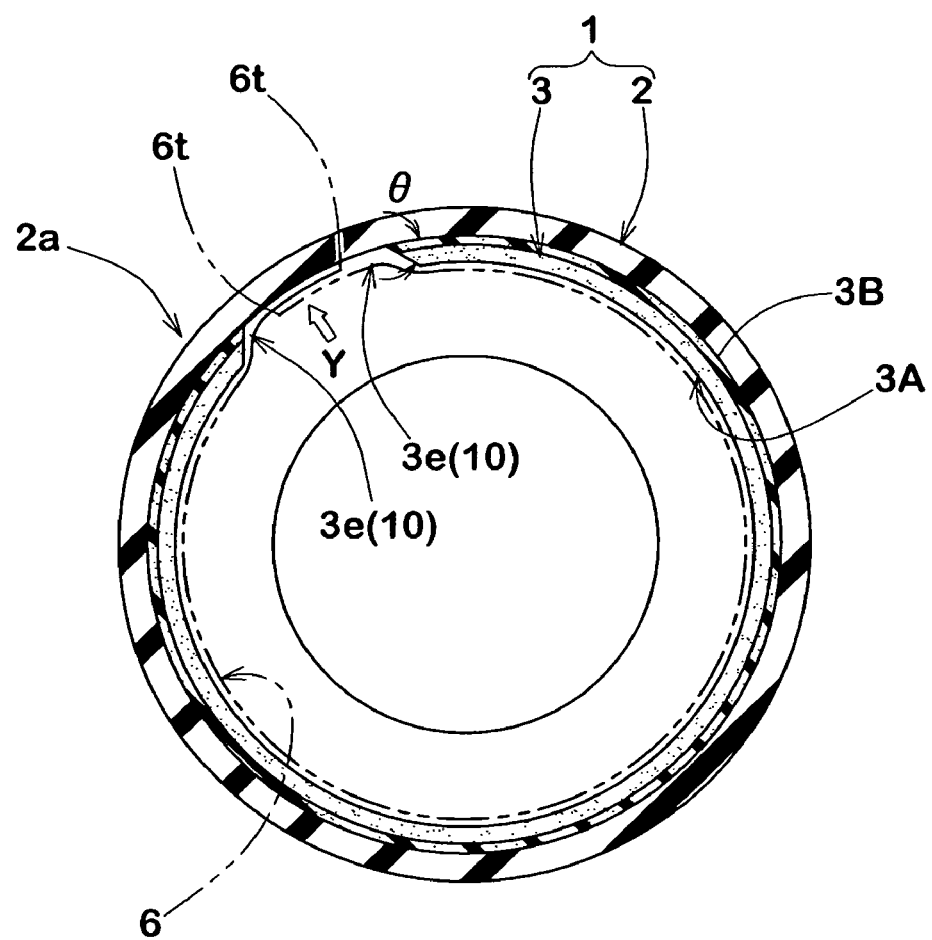
FIG. 2 is a circumferential sectional view of FIG. 1 taken along a tire equator.
Figure 3:
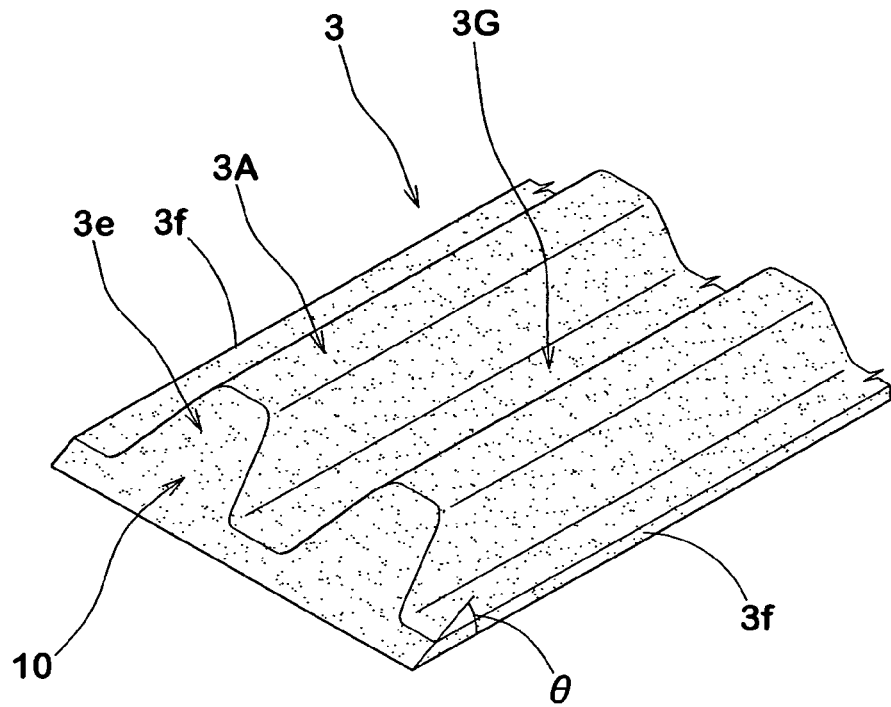
FIG. 3 is a perspective view showing an embodiment of a circumferential edge of the noise damper.
Figure 4:
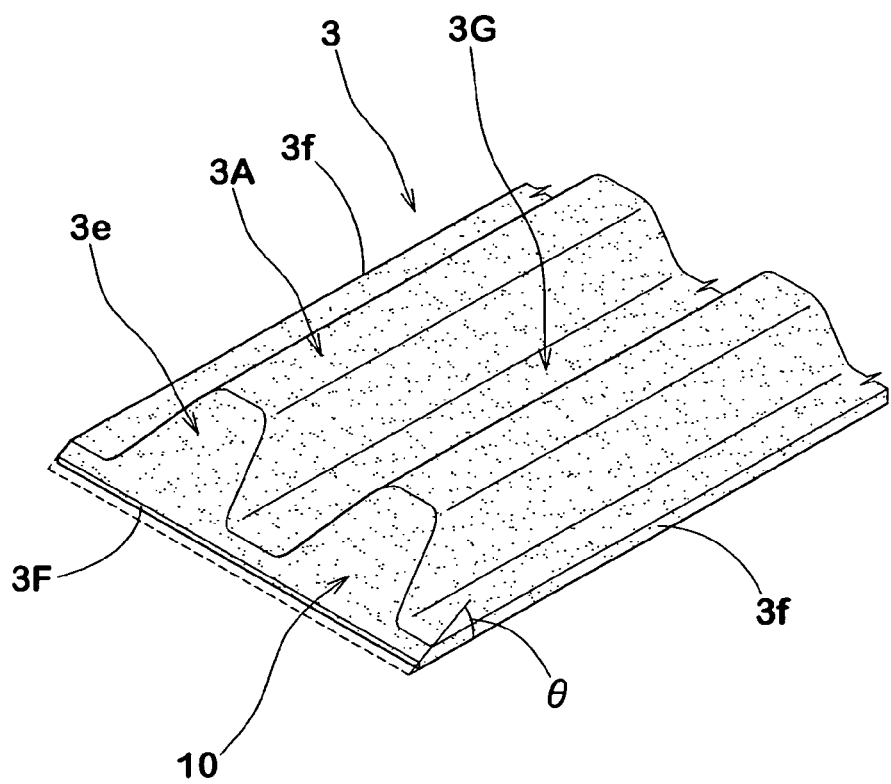
FIG. 4 is a perspective view showing another embodiment of a circumferential edge of the noise damper.

As shown in FIGS. 2 and 3, both ends 3e and 3e of the noise damper 3 in the circumferential direction is formed by a tapered portion 10 whose thickness is gradually reduced toward the end in the circumferential direction. An angle theta of the tapered portion 10 sandwiched between the bottom surface 3A and the upper surface 3B is an acute angle, and mass of the each end 3e and 3e of the noise damper 3 is reduced as compared with the other portion. With this, concentration of stress on the adhesive surfaces of the both ends 3e of the noise damper 3 can be reduced. To further enhance this effect, it is preferable that the angle theta of the tapered portion 10 is in a range of from 15 to 70 degrees. As shown in FIG. 4, an acute tip end of the tapered portion 10 may have an end surface 3F which is cut perpendicularly to the bottom surface 3A.

The noise damper 3 is fixed to the inner surface 2i of the tire 2 by adhesive or double-coated adhesive tape.

Suitable examples of the adhesive are a soluble type adhesive in which synthetic rubber is dissolved in organic solvent or synthetic rubber-based liquid adhesive such as latex type which is dispersed in water.

Examples of the double-coated adhesive tape are a sheet base material such as weave is formed at its both surface with adhesive layer, tapes made of only adhesive layer without using the basic material, or various tapes. In the embodiment, the former double-coated adhesive tape is used.

Figure 5:
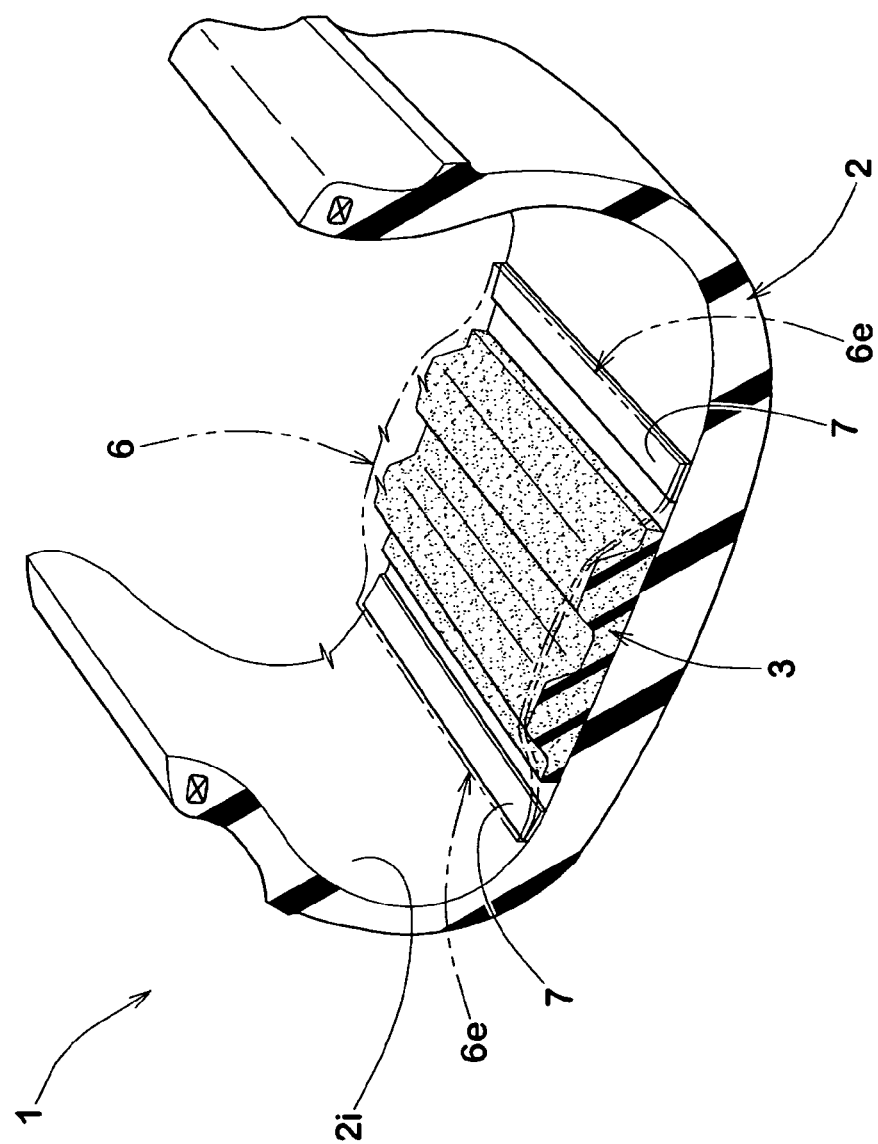
FIG. 5 is a perspective view showing the tire and noise damper assembly seen from the inside thereof.

AS shown in FIGS. 1, 2 and 5, a protective cover 6 for protecting at least a part of the noise damper 3 from water and ultraviolet rays is detachably attached to the tire 2.

In the first embodiment, the protective cover 6 is located relatively close to the noise damper 3, and the protective cover 6 covers the noise damper 3. The protective cover 6 is of a band-like shape extending in the circumferential direction of the tire. The protective cover 6 has a width larger than the width SW of the noise damper 3, and the both side edges 6e thereof in the widthwise direction are attached to the inner surface 2i of the tire 2 separated from the side edge 3f of the noise damper 3. Accordingly, the entire width of the noise damper 3 is covered with the protective cover 6.

Various methods can be used for fixing the protective cover 6 and the tire 2. For example, they are fixed to each other in a state in which they are water-tightly or substantially water-tightly connected to each other so that water does not easily enter the noise damper 3 from a gap between the protective cover 6 and the tire 2. When the tire and noise damper assembly 1 is mounted on a rim and the assembly 1 is actually used, since it is necessary to expose the noise damper 3 to the cavity i and thus, it is necessary to detach the protective cover 6. Therefore, it is preferable that the protective cover 6 and the tire 2 are fixed to each other such that the protective cover 6 can relatively easily be detached from the tire 2. It is especially preferable that the double-coated adhesive tape 7 extending continuously along the side edge 6e of the protective cover 6 in the circumferential direction of the tire is used, the protective cover 6 and the tire 2 are adhered to each other without a gap therebetween. Since the protective cover 6 is not fixed to the noise damper 3 directly, when the protective cover 6 is detached, the noise damper 3 is not damaged.

The protective cover 6 of this embodiment is disposed at the location close the to noise damper 3 such as to straddle the noise damper 3. Therefore, if the width of the cover 6 is too small, it is difficult to carry out the adhering operation, and the productivity may be deteriorated. From such a viewpoint, the width of the protective cover 6 (development width) is not less than 150% of the width SW of the noise damper 3, more preferably not less than 165%. On the other hand, if the width of the protective cover 6 is too wide, the cost is increased and thus, it is preferable that the width of the protective cover 6 is not more than 270% of the width SW of the noise damper 3, more preferably not more than 200%.

The protective cover 6 has water-proof and ultraviolet rays cutting abilities. The water-proof ability can easily be secured by forming the protective cover 6 of a film through which water can not pass. Examples of the film are a resin film including a polymer such as polyethylene, polyvinyl chloride, polypropylene, or acrylonitrile/styrene, or a metal film made of metal material (e.g., aluminum), or a combined film in which these films are laminated on one another.

Concerning the ultraviolet rays cutting ability, the cutting ratio of ultraviolet rays with wavelength of 350 nm is not less than 60%, more preferably not less than 70%, more preferably not less than 80%. The ultraviolet rays cutting ratio is obtained by measuring the beam transmittance.

The ultraviolet rays cutting ability can be obtained by adding ultraviolet rays sorbent, ultraviolet rays dispersion agent and/or coloring agent to a resin film polymer. The ultraviolet rays cutting ability can also be obtained by mixing lightproof material (e.g., aluminum or titanium) in the surface of the resin film by vapor deposition.

In this embodiment, as for the protective sheet 6, a resin film which contains ultraviolet rays sorbent and low foaming polyethylene is used.

When the tire and noise damper assembly 1 provided with the protective cover 6 is kept in storage, it is possible to prevent the noise damper 3 from being deteriorated by water or ultraviolet rays, and to prevent its strength from being lowered. From such a view point, it is preferably that the protective cover 6 has a circumferential length of covering at least 60% of the circumferential length of the noise damper 3. More preferably, as shown in FIG. 2 both ends 6t of the protective cover 6 in the circumferential direction of the tire are overlapped on each other so that they are continuous annually. When the length of the protective cover 6 is less than 100% of the circumferential length of the noise damper 3, it is desirable that the assembly 1 is vertically kept so that the portion in which the noise damper 3 is not covered with the protective cover 6 comes upward. With this, it is possible to sufficiently protect the noise damper 3 from water and ultraviolet rays.

Figure 6:
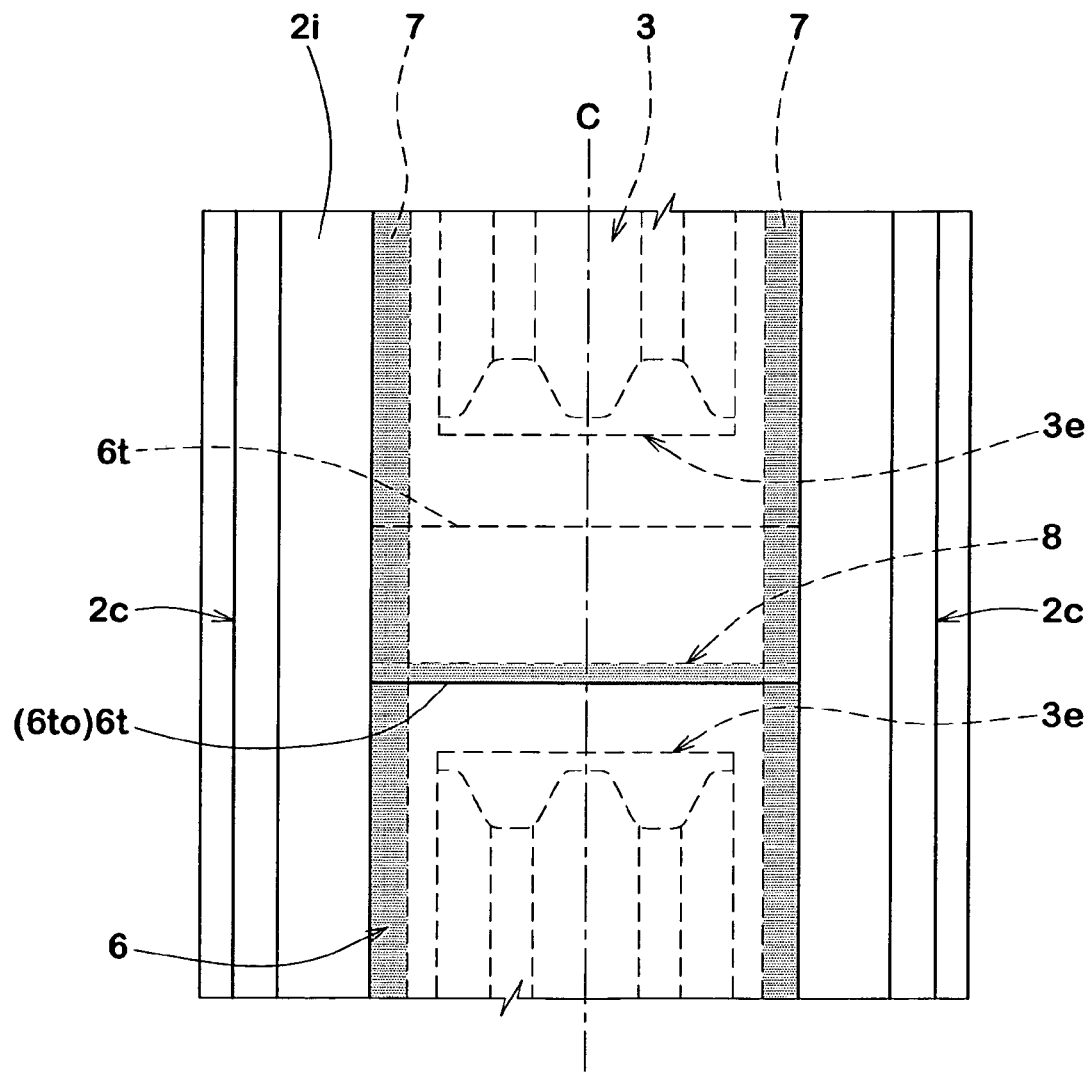
FIG. 6 is a plan view showing an embodiment of the tire and noise damper assembly seen from the inside thereof.

When the protective cover 6 is continuously formed in the circumferential direction of the tire, as shown in FIG. 6, it is preferable that both the ends 6t and 6t of the protective cover 6 are overlapped with each other in the gap between both the ends 3e and 3e of the noise damper 3. Further, in the overlapped portion of the protective cover 6, adhesive portion extending in the widthwise direction of the noise damper 3 is preferably provided. In this embodiment, the adhesive portion is provided along the edge part 6t of the end 6t of the protective cover 6 being overlapped at the upper side by using a double-coated adhesive tape 8. With this, it is possible to perfectly protect the noise damper 3 from ultraviolet rays and water in all storage cases.

As described above, since it is necessary to detach the protective cover 6 at the later stage, it is possible to the double-coated adhesive tapes 7 and 8 can smoothly come off from the inner surface 2i of the tire 2 without being cut. From such a view point, double-coated tapes 7 and 8 preferably have tensile strength of not less than 19.5 (N/10 mm). The tensile strength of the double-coated adhesive tape is measured in accordance with "test method of tensile strength of adhesive tape" of JIS z0237.

Figure 7:
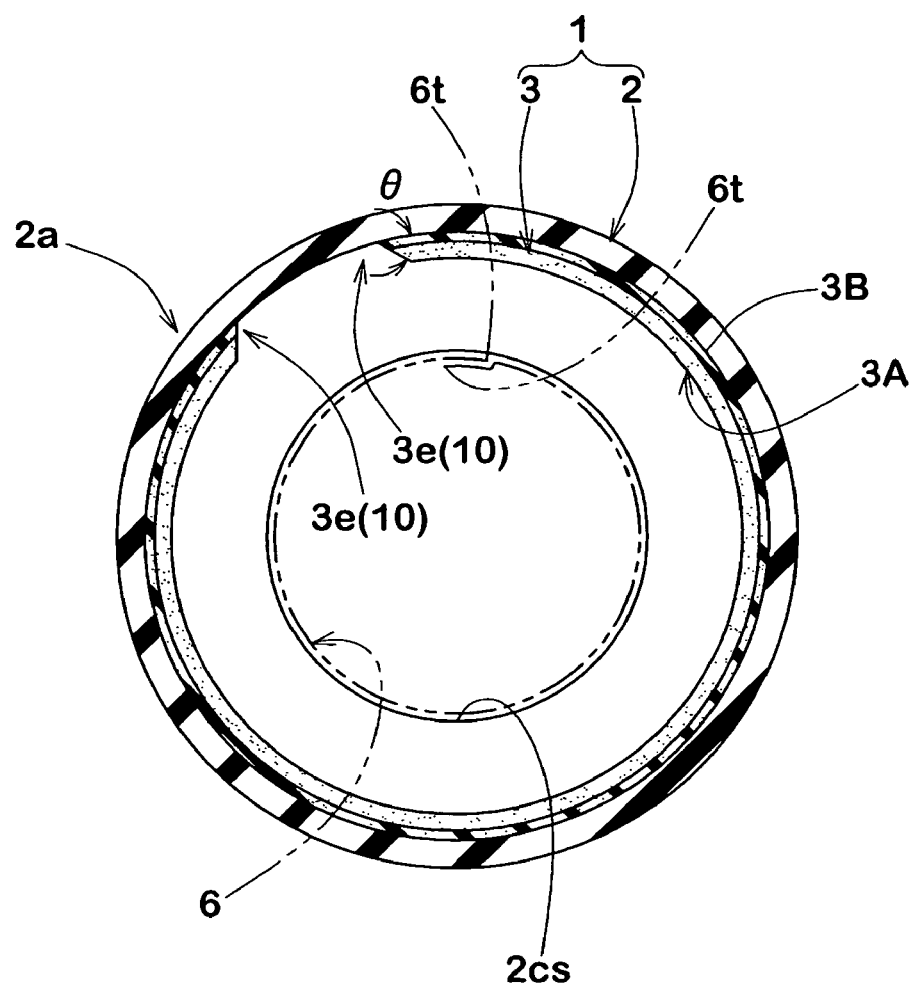
FIG. 7 is a circumferential sectional view of the assembly taken along a tire equator showing another embodiment of the protective cover.
Figure 8:
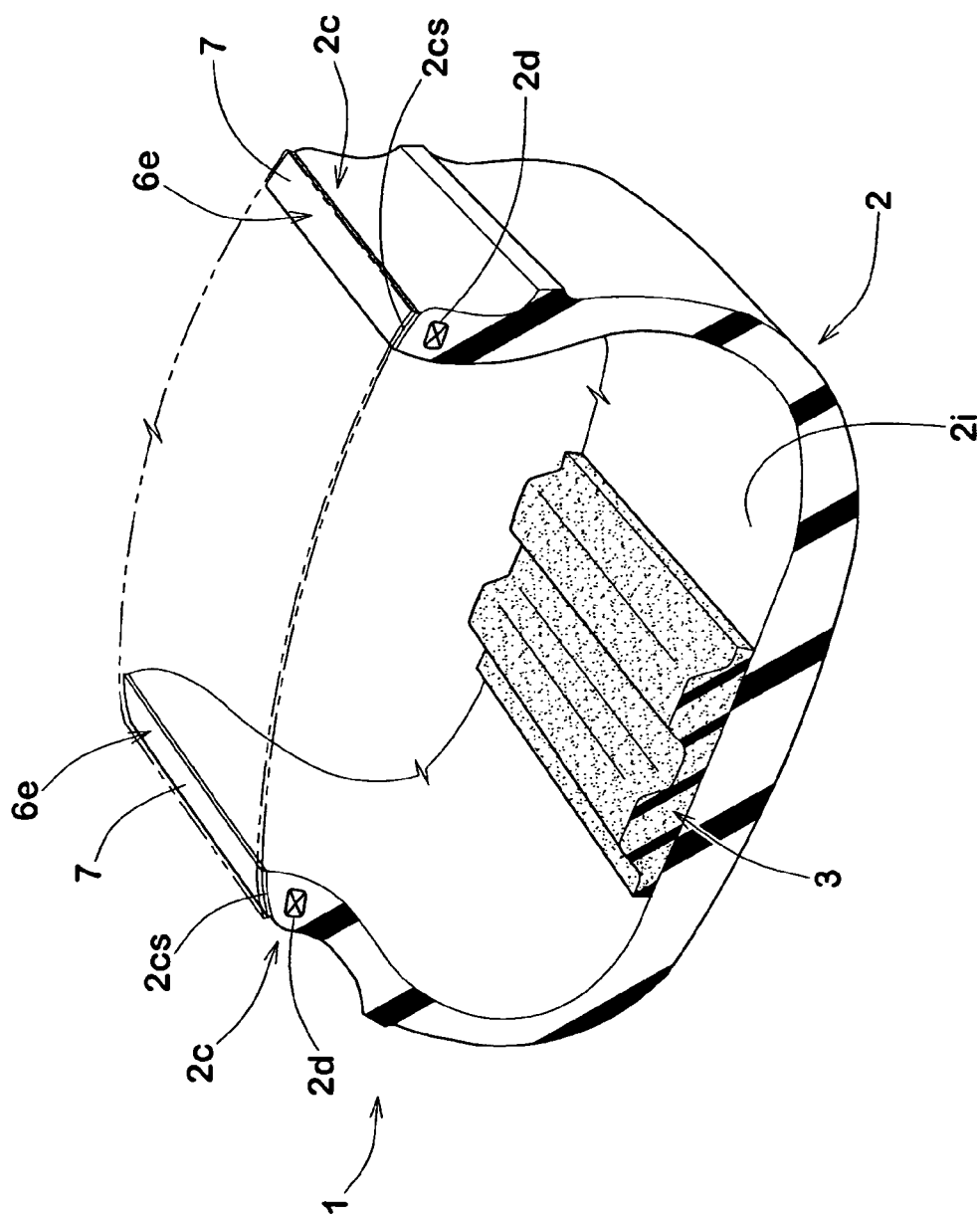
FIG. 8 is a perspective view showing another embodiment of the assembly.

FIGS. 7 and 8 show a second embodiment. In this embodiment, the protective cover 6 is bridged between the bead portions 2c and continuously extends annularly in the circumferential direction of the tire. In this embodiment also, the protective cover 6 is fixed to the tire 2. More specifically, each side edge 6e of the protective cover 6 is fixed to each bead seat surface 2cs of the bead portion 2c through the double-faced tape 7. Here, the bead seat 2cs is a bottom of the bead which sits on a wheel rim. The double-coated adhesive tape 7 also extends continuously along the side edge 6e, and water is prevented from entering from between the protective cover 6 and the bead seat surface 2cs. The protective cover 6 and the double-coated adhesive tape 7 of the first embodiment can be used in this second embodiment also.

In this embodiment also, both the ends 6t of the protective cover 6 are overlapped with each other and tightly adhered. With this, the cavity i of the tire is substantially sealed, and it is possible to prevent invasion of water and irradiation of ultraviolet rays more reliably. It is desirable that the protective cover 6 has a circumferential length of covering at least 70% of the circumferential length of the bead portion (circumferential length of the bead seat surface 2$cs$), more preferably not less than 80%. When the protective cover 6 is not continuous, it is desirable that the assembly 1 is vertically kept so that the portion in which the noise damper 3 is not covered with the protective cover 6 comes upward. With this, it is possible to sufficiently protect the noise damper 3 from water and ultraviolet rays.

If the width of the protective cover 6 is too small, it becomes difficult to bridge the protective cover 6 between the bead portions 2$c$, and if the width is too wide, the pasting operability is prone to be deteriorated. From such a view point, although it is not limited, the width (developed width) of the protective cover 6 is preferably in a range of 110 to 133% of a distance between the bead portions 2$c$ in the axial direction of the tire.

Figure 9:
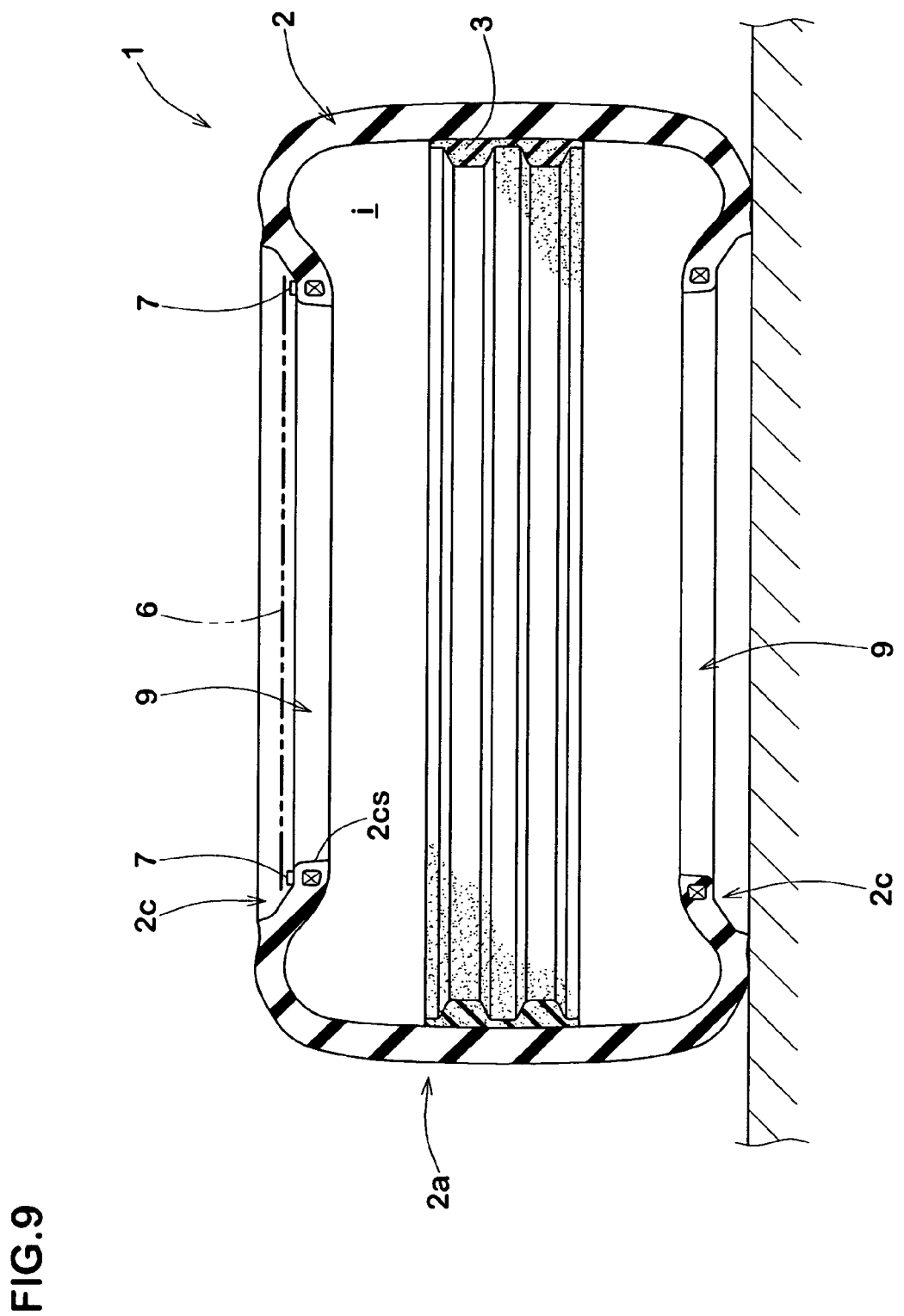
FIG. 9 is a cross sectional view showing another embodiment of the assembly placed in horizontal.

FIG. 9 shows a third embodiment of the invention. In this embodiment, a protective cover 6 is attached to the bead portion 2$c$ so as to close at least one circular opening 9 surrounded by the bead portion 2$c$. In the embodiment shown in FIG. 9, when the tire and noise damper assembly 1 is horizontally placed, the opening 9 located on the upper side is closed with the protective cover 6. The protective cover 6 is of a substantially circular shape for example, and is fixed such as to close the opening 9 through the double-coated adhesive tape 7 disposed annularly on the outer surface of the bead portion 2$c$. In this embodiment, the protective cover 6 may be provided on the openings 9 on the both sides.

Although the preferred embodiments of the present invention have been described in detail, the invention is not limited to the embodiments, and the invention can variously be modified and carried out.

Comparative Test:

In order to confirm the effect of the present invention, a plurality of tire and noise damper assemblies were manufactured based on the specification shown in Table 1. Then, various performances were tested. The common specifications of the assemblies are as follows:

Size
 Tire size: 215/45ZR17 87W
 Width BW of belt: 166 mm
 Rim size: 17×7 JJ

Figure 10A:
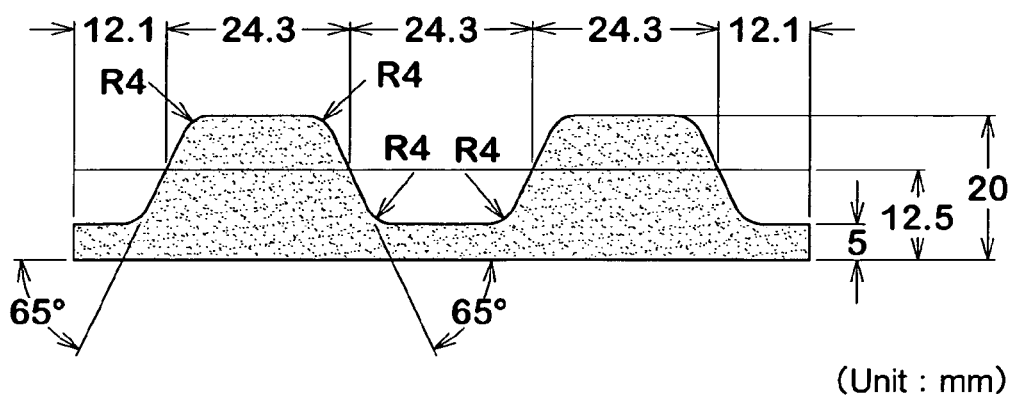
FIGS. 10(A) and 10(B) are cross sectional views showing two examples of the noise damper.

Noise Damper
 Material: ether-based polyurethane sponge
 specific gravity: 0.039
 Product name: ESH2 made by Inoac Corp.
 Cross section shape: FIGS. 10(A) and (B)
 Circumferential Length: 1830 mm
 (Both circumferential ends of the noise damper were cut at taper angle theta=45 degrees.)

Fixing Method

A long noise damper was curved along a tread region of a tire cavity and pasted by a double-coated adhesive tape ("E700" made by Ebisu Kasei). The double-coated adhesive tape has the same size as the fixing surface of the noise damper.

Protective Cover

A polyethylene sheet was produced by mixing 3.1 kg of organic-based ultraviolet rays sorbent (product No. PEX1338 made by Tokyo Ink corp.) into 100 kg of low foaming polyethylene (production No. UF-421 made by Japan Polyethylene Corp.), and the polyethylene sheet was used (3% ultraviolet rays sorbet). The sheet thickness was 0.05 mm.

Fixing method of protective cover: double-coated adhesive tapes (production No. "5000NS" made by Nitto Denko Corp.) With width of 10 mm was used. Test method is as follows.

Production Efficiency Test:

Five operators carried out the fixing operation of the protective cover on the tire having a noise damper with the cross section shape shown in FIG. 10(A). The operation easiness was evaluated by the operators' sensitive on a scale from 1 to 5. A result shows an average value of the five operators. AS the numeric value is greater, the result is more excellent.

Figure 10B:
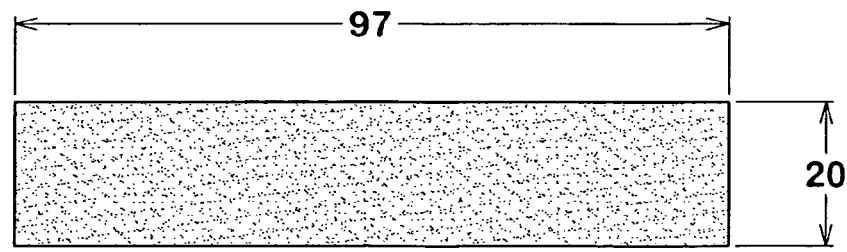

Water-Proofing Performance Test:

Test assemblies each with a noise damper which had a cross section shape shown in FIG. 10(B) were placed in outdoor storage with no roof in a vertical state, and a liter of water was poured in the tire cavity. After two weeks, water was thrown away, tires were wiped off and then, the protective covers were detached, presence and absence of water absorption were checked. Concerning an example in which the protective cover was bridged between the pair of bead portions, and an example in which an opening of the bead portion was closed, since water could not be put into the tire cavity, the initial one liter of water was not poured, and the test was carried out.

Rain Water Invasion Test:

Test assemblies each with a noise damper which had a cross section shape as shown in FIG. 10(B) were placed in outdoor storage with no roof in a vertical/horizontal state for one hour at a rainy day. After that, the protective cover was detached, and water absorption of the noise damper was checked.

Tensile Strength Test of Noise Damper:

After the water-proofing test, dumbbell-shaped test pieces including the outer surfaces of the noise dampers were prototyped, and the tensile strength thereof were measured according to JIS-K6400. As the numeric value is greater, the deterioration is smaller and the result is more excellent.

Table 1 shows the test result. From the Table 1, it was confirmed that the examples effectively suppress the deterioration of the noise damper.

TABLE 1

|  |  | Ref. 1 | Ref. 2 | Ex. 1 | Ex. 2 | Ex. 3 | Ex. 4 | Ex. 5 | Ex. 6 |
| --- | --- | --- | --- | --- | --- | --- | --- | --- | --- |
| Specification of protective cover | Fixing method | None |  |  |  | FIG. 5 |  |  |  |
|  | Ultraviolet rays (350 mm) cutting ratio (%) | — | 0 | 80 | 80 | 80 | 80 | 80 | 80 |
|  | Water-proofing performance | — | Excellent | Excellent | Excellent | Excellent | Excellent | Excellent | Excellent |
|  | Width (mm) | — | 260 | 260 | 160 | 130 | 160 | 160 | 160 |

TABLE 1-continued

|  |  |  |  |  |  |  |  |  |  |
|---|---|---|---|---|---|---|---|---|---|
|  | (Rate to width of noise damper (%)) | — | 268 | 268 | 165 | 134 | 165 | 165 | 165 |
|  | Length (mm) | — | 2000 | 2000 | 2000 | 2000 | 1100 | 1100 | 700 |
|  | (Rate to length of noise damper (%)) | — | 108 | 108 | 108 | 108 | 59 | 59 | 38 |
| Placing manner of assembly |  | Vertical | Vertical | Vertical | Vertical | Vertical | Vertical * | Horizontal | Vertical * |
| Test Result | Production Efficiency Test (on a scale from 1 to 5) | — | 5.0 | 5.0 | 5.0 | 3.0 | 5.0 | 5.0 | 5.0 |
|  | Water-proofing performance (presence and absence of water absorption) | Presence | Absence | Absence | Absence | Absence | Absence | Absence | Absence |
|  | Rain water invasion resistance (presence and absence of water absorption) | Many | Absence | Absence | Absence | Absence | Slightly exist | Slightly exist | Slightly exist |
|  | Tensile strength of noise damper (N/10 mm) | 81 | 83 | 98 | 98 | 98 | 98 | 98 | 98 |

|  |  | Ex. 7 | Ex. 8 | Ex. 9 | Ex. 10 | Ex. 11 | Ex. 12 |
|---|---|---|---|---|---|---|---|
| Specification of protective cover | Fixing method | colspan FIG. 8 ||||||
|  | Ultraviolet rays (350 mm) cutting ratio (%) | 80 |||||  |
|  | Water-proofing performance | Excellent ||||| |
|  | Width (mm) | 240 | 200 | 180 | 180 | 180 | 180 |
|  | (Rate to bead width) (%) | 133 | 111 | 100 | 100 | 100 | 100 |
|  | Length (mm) | 1400 | 1400 | 1400 | 1000 | 1000 | 600 |
|  | (Rate to bead circumferential length) (%) | 101 | 101 | 101 | 72 | 72 | 43 |
| Placing manner of tire |  | Vertical | Vertical | Horizontal | Vertical * | Horizontal | Vertical * |
| Test Result | Production Efficiency Test (on a scale from 1 to 5) | 5.0 | 5.0 | 2.5 | 2.5 | 2.5 | 2.5 |
|  | Water-proofing performance (presence and absence of water absorption) | Absence | Absence | Absence | Presence | Presence | Presence |
|  | Rain water invasion resistance (presence and absence of water absorption) | Absence | Absence | Absence | Slightly exist | Slightly exist | Many |
|  | Tensile Strength of noise damper (N/10 mm) | 98 | 98 | 98 | 98 | 98 | 98 |

|  |  | Ex. 13 | Ex. 14 | Ex. 15 |
|---|---|---|---|---|
| Specification of protective cover | Fixing method | FIG. 9 | FIG. 9 (mounted on upper and lower openings) ||
|  | Ultraviolet rays (350 mm) cutting ratio (%) | 80 | 80 | 80 |
|  | Water-proofing performance | Excellent | Excellent | Excellent |
|  | Diameter (mm) | 460 | 460 | 460 |
|  | (Rate to bead diameter) (%) | 105 | 105 | 105 |
| Placing manner of tire |  | Vertical | Vertical | Horizontal |
| Test Result | Production Efficiency Test (on a scale from 1 to 5) | 5.0 | 5.0 | 5.0 |
|  | Water-proofing performance (presence and absence of water absorption) | Absence | Absence | Absence |
|  | Rain water invasion resistance (presence and | Absence | Absence | Absence |

TABLE 1-continued

| | | | |
|---|---|---|---|
| absence of water absorption) | | | |
| Tensile Strength of noise damper (N/10 mm) | 98 | 98 | 98 |

* Assembly was placed such that a portion of the noise damper that is not covered with protective cover comes upward.

The invention claimed is:

1. A pneumatic tire and noise damper assembly comprising a pneumatic tire,
a noise damper being attached to an inner surface of the tire and extending in the circumferential direction of the tire, and
a protective cover being detachably attached to the tire and protecting the noise damper from ultraviolet rays and water,
wherein the protective cover has a larger width than that of the noise damper and extends in the circumferential direction of the tire so that the entire width of the noise damper is covered with the protective cover, and
wherein each side edge of the protective cover is attached to the inner surface of the tire separated from the side edge of the noise damper such that the noise damper can be exposed to the tire cavity by relatively easily detaching the protective cover from the tire and that the protective cover is located close to the noise damper so as to straddle the noise damper.

2. The pneumatic tire and noise damper assembly according to claim 1, wherein the protective cover has a circumferential length of covering at least 60% of the circumferential length of the noise damper.

3. The pneumatic tire and noise damper assembly according to claim 1, wherein the protective cover includes circumferential edges each being overlapped together to form an annular body.

4. The pneumatic tire and noise damper assembly according to claim 1, wherein the protective cover has a property which can cut at least 60% of ultraviolet ray having a wavelength of 350 nm.

5. The pneumatic tire and noise damper assembly according to claim 1, wherein the protective cover is attached to the inner surface of the tire using a double-coated adhesive tape having a tensile strength of at least 19.5 N/10 mm.

* * * * *